United States Patent [19]

Hamanaka et al.

[11] Patent Number: 4,985,827
[45] Date of Patent: Jan. 15, 1991

[54] COMPUTER FOR SYNCHRONIZED READ AND WRITE OF VECTOR DATA

[75] Inventors: Naoki Hamanaka; Teruo Tanaka, both of Tokyo; Koichiro Omoda, Kanagawa; Shigeo Nagashima, Tokyo; Junji Nakagoshi, Tokyo; Kazuo Ojima, Tokyo, all of Japan

[73] Assignee: Hitachi, Ltd., Tokyo, Japan

[21] Appl. No.: 226,376

[22] Filed: Jul. 29, 1988

[30] Foreign Application Priority Data

Jul. 29, 1987 [JP] Japan .............................. 62-187529

[51] Int. Cl.$^5$ ............................................ G06F 12/00
[52] U.S. Cl. ..................................... 364/200; 364/231.9; 364/232.21
[58] Field of Search ... 364/200 MS File, 900 MS File

[56] References Cited

U.S. PATENT DOCUMENTS

| | | | |
|---|---|---|---|
| 4,128,880 | 12/1978 | Gay, Jr. ............................ | 364/200 |
| 4,128,881 | 12/1978 | Yamamoto et al. ................. | 364/200 |
| 4,302,818 | 11/1981 | Niemann ............................ | 364/200 |
| 4,636,942 | 1/1987 | Chen et al. . | |
| 4,780,811 | 10/1988 | Aoyama et al. ..................... | 364/200 |
| 4,803,620 | 2/1989 | Inagami et al. ..................... | 364/200 |

FOREIGN PATENT DOCUMENTS

| | | |
|---|---|---|
| 0105125 | 4/1984 | European Pat. Off. . |
| 0123509 | 10/1984 | European Pat. Off. . |
| 58-207165 | of 0000 | Japan . |
| 8301326 | 4/1983 | World Int. Prop. O. . |

OTHER PUBLICATIONS

Fernbach, S., "Supercomputer Class IV Systems, Hardware and Software", Elsevier Science Publishers B.V., North Holland, 1986, pp. 69–81.
Proceedings of the 12th Annual International Symposium on Computer Architecture, Jun. 17–19, 1985, Boston Mass., pp. 136–144, "MU6V: A Parallel Vector Processing System", by R. N. Ibbett, et al.

Primary Examiner—Raulfe B. Zache
Attorney, Agent, or Firm—Fay, Sharpe, Beall, Fagan, Minnich & McKee

[57] ABSTRACT

A computer comprising a circuit for writing a group of ordered data elements onto the main storage; a circuit for reading said group of data from the main storage; and a circuit which is connected to the writing circuit and to the reading circuit, and which ensures the sequence of main storage references between said writing circuit and said reading circuit such that said reading circuit will not read the data elements that have not yet been written by said writing circuit among said group of data elements.

14 Claims, 7 Drawing Sheets

COMPUTER FOR SYNCHRONIZED READ AND WRITE OF VECTOR DATA

BACKGROUND OF THE INVENTION

The present invention is related to a computer for processing vector data.

In a conventional parallel computer sharing a main storage which is constituted by a plurality of vector processors, provision is made of a semaphore register that is shared by vector processors in the configuration. When a vector data written onto the main storage by a given vector processor in the configuration is to be read out by other vector processor, the semaphore register is used and the sequence of main storage references is ensured by effecting the exclusive control for the whole region where vector data of the main storage are stored. Apparatuses of this kind have been disclosed in U.S. Pat. No. 4,636,942 and S. Fernbach, "Supercomputers Class IV Systems, Hardware and Software", Elsevier Science Publishers B.V., Horth holland, 1986, pp. 69-81.

FIG. 5 illustrates how to use the abovementioned prior technology, wherein a VST instruction works to store the vector data in the main storage, a POST instruction works to finish the execution of the instruction after the main storage reference for all preceding instructions has been finished, a WAIT instruction works to finish the execution of the instruction after the execution of the POST instruction has been finished, and a VLD instruction works to load the vector data from the main storage. FIG. 5 is a time chart illustrating the operation in which two vector processors hand the vector data over via the main storage, and wherein an instruction sequence executed by a vector processor 1 (hereinafter referred to as VP1) is given by

VST
POST and an instruction sequence executed by a vector processor 2 (hereinafter referred to as VP2) is given by

WAIT
VLD

It is now presumed that the main storage region which is used by the VST instruction executed by VP1 for storing the vector data is the same as the main storage region which is used by the VLD instruction executed by VP2 for loading the vector data, and that the arrangements of elements of vector data in this, region are in agreement with each other. When the above-mentioned prior technology is used as shown in FIG. 5, execution of VLD instruction is started by the VP2 after the execution of VST instruction by the VP1 has been completely finished.

If attention is given to the individual elements of vector data, on the other hand, the load of zero-th element of vector data on the main storage executed by the VLD instruction of VP2 needs not wait for the complete completion of the execution of VST instruction of VP1 but needs simply wait for the completion of the store of zero-th element in the VST instruction of VP1. This also holds true for the elements other than the zero-th element.

According to the above-mentioned prior art, however, no attention has been given to this fact, and the execution of the VLD instruction by VP2 is started being delayed by roughly the time for executing the VST instruction. The delay increases with the increase in the length of vector in the vector data that are to be handled.

SUMMARY OF THE INVENTION

The object of the present invention is to provide a computer which enables the operation for storing the vector data and the operation for storing the vector data to be excited in parallel with each other when a plurality of processors handling the vector data are to hand over the vector data via a main storage yet ensuring the sequence of main storage references and eliminating undesired waiting time.

For this object the present application deals with a computer which comprises: a main storage, a circuit for writing onto said main storage a group of data elements having sequence, a circuit for reading said group of data from said main storage, and a circuit which is connected to said writing circuit and to said reading circuit which ensures the sequence of main storage references between said writing circuit and reading circuit, such that among said group of data elements, the data elements which has not yet been written by said writing circuit will not be read by said reading circuit.

That is, the present application deals with a computer system constituted by a plurality of processors which share a main storage to handle vector data, wherein each processor is provided with a registration circuit which registers that the individual elements of vector data to be stored are written onto the main storage for each of the elements of vector data to be stored, thereby to store the data, provided with synchronized store circuits for effecting the registration to said registration circuit simultaneously therewith, and is further provided with synchronized load circuit which after said data is stored in said registration circuit, starts to load the data and erases the registration from said registration circuit.

DESCRIPTION OF THE PREFERRED EMBODIMENTS

Figure 1:
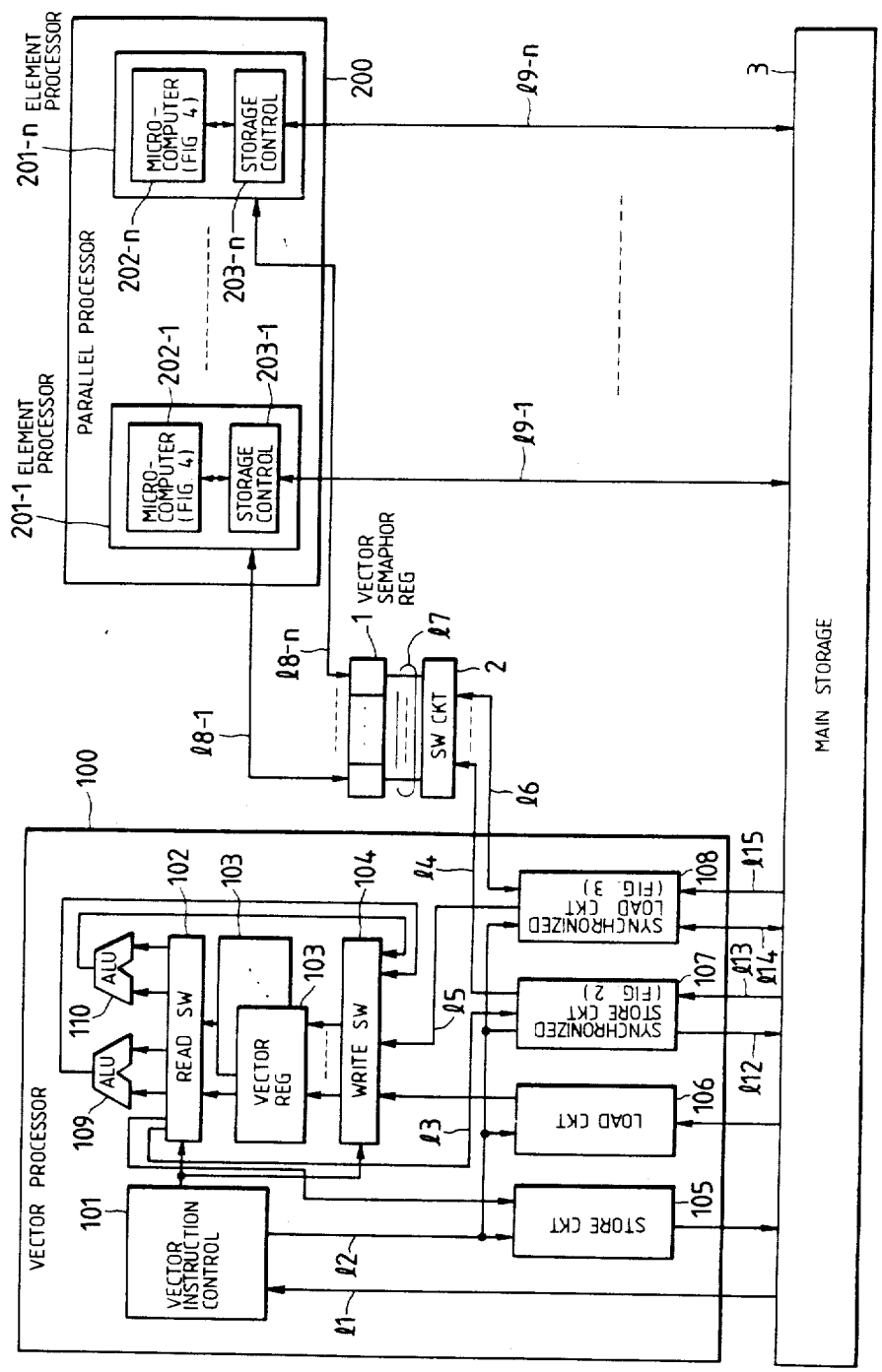
FIG. 1 is a diagram illustrating the whole configuration of a computer according to a first embodiment of the present invention.

Embodiments of the invention will now be explained hereinbelow.

First Embodiment

A first embodiment will now be explained in conjunction with the drawings. First, outline of the computer according to the present invention will be described in conjunction with FIG. 1, wherein reference numeral 100 denotes a vector processor, and 200 denotes a parallel processor. Reference numeral 1 denotes a vector semaphore register and 3 denotes a main storage.

As will be mentioned later, the computer according to the present invention hands over the vector data between the vector processor 100 and the parallel processor 200 via main storage 3, permitting the two processors to be operated simultaneously and the vector data to be handed over at high speeds.

Next, configuration of the vector processor 100 will be described. In FIG. 1, reference numeral 101 denotes a vector instruction control which successively reads instructions from the main storage through a line (1 to control the execution of instructions, 103 denotes a vector register which holds vector data of n elements from the first to n-th elements, 102 denotes a read switch for reading vector data from the vector register 103, reference numeral 104 denotes a write switch for writing vector data onto the vector register 103, and reference numerals 109 and 110 denotes arithmetic units that effect addition and multiplication. Reference numeral 105 denotes a store circuit which controls the writing of vector data from the vector register 103 onto the main storage, 106 denotes a load circuit which controls the writing of vector data from the main storage onto the vector register 103, reference numeral 107 denotes a synchronized store circuit that is newly provided according to the present invention, and 108 denotes a synchronized load circuit newly provided according to the present invention.

The vector processor 100 operates as described below. First, the load circuit 106 writes some vector data from the main storage onto the vector register 103 via write switch 104. In parallel with this, the arithmetic units 109 and 110 successively read the vector data from the vector register 103 via read switch 102, effect arithmetic operations such as addition and multiplication, and write the results onto the vector register 103 via write switch 104, iteratively. Thus, the required arithmetic operation is finished, and the result is obtained on the vector register 103. The store circuit 105 then writes the operated result of the vector register 103 onto the main storage via read switch 102. The above-mentioned operation is executed by the vector instruction control 101 in accordance with the instruction sequence successively read by the vector instruction control 101 through the line 11.

Next, the parallel processor 200 will be explained. The parallel processor 200 consists of n element processors 201-1 to 201-n where n denotes the number of elements of vector data that can be held by the vector register 103. Hereinafter, a j-th element processor 201-j (j=1,—, n) will be explained.

Figure 4:
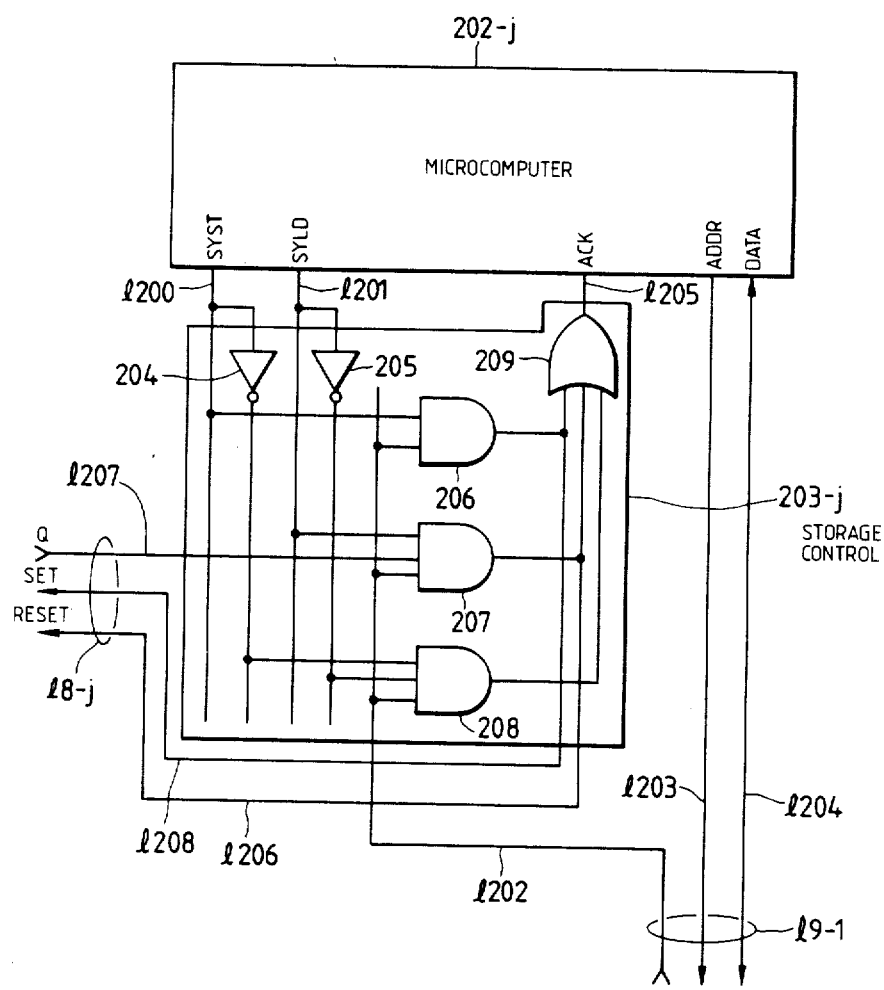
FIG. 4 is a diagram illustrating the configuration of an element processor (201-j) of FIG. 1.
Figure 5:
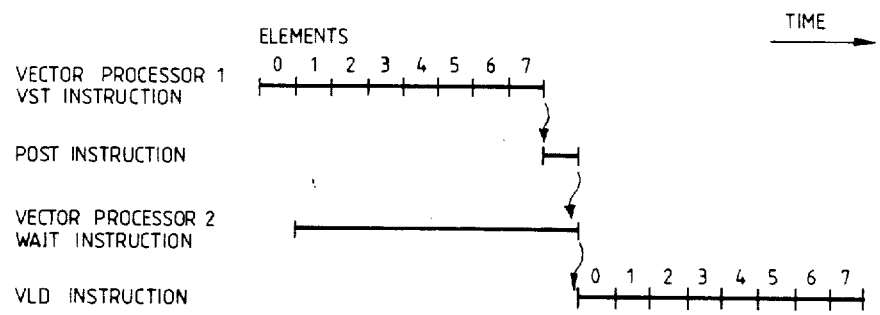
FIG. 5 is a time chart illustrating how to hand over the vector data among the processors using a main storage according to prior art.

FIG. 4 is a diagram showing the configuration of the element processor 201-j which consists of a microcomputer 202-j and a storage control 203-j. The microcomputer 202-j consists of a microprocessor such as Model MC6800 manufactured by Motorola Co. to which a memory is coupled. To put the present invention into practice, however, the following two instructions are newly provided. One of the newly provided instructions is a synchronized load instruction. Operation of the microcomputer 202-j for executing the synchronized load instruction is nearly the same as that of the general load instruction. That is, the microcomputer 202-j produces through a line 1203 and address that is to be loaded, and receives the data of line 1204 as a signal arrives at a line 1205. In executing the synchronized load instruction, however, the microcomputer 202-j sends onto a line 1201 a signal whose value is true. In other cases, the microcomputer 202-j produces onto the line 1201 a signal whose truth value is false. Another newly provided instruction is a synchronized store instruction. Operation of the microcomputer 202-j at the time of executing the synchronized store instruction is nearly the same as that of the general store instruction. That is, the microcomputer 202-j produces from the line 1203 an address that is to be stored and produces from the line 1204 a data that is to be stored, and finishes the operation when a signal arrives at the line 1205. At the time of executing the synchronized store instruction, however, the microcomputer 202-j produces on a line 1200 a signal whose truth value is true. In other cases, the microcomputer 202-j produces on the line 1200 a signal whose truth value is false.

A storage control 203-j is newly provided for putting the present invention into practice. When the above-mentioned two newly provided instructions are being executed by the microcomputer 202-j, the storage control 203-j performs a particular operation which will be described later in detail. In other cases, the storage control 203-j transmits the signal of line 1202 directly to the line 1205.

The vector semaphore register 1 will now be described in conjunction with FIG. 1. The vector semaphore register 1 is divided into n fields each of which being imparted with first to n-th numbers and connected to element processors 201-1 to 201-n via lines 18-1 to 1-8-n. Each field holds data of one bit. The element processor 201-j (j=1,—, n) reads a value of j-th field of the vector semaphore register 1 via line 18-j and sets a value 0 or 1 to the j-th field. Furthermore, the synchronized store circuit 107 and the synchronized load circuit 108 in the vector processor 100 give access to the vector semaphore register 1. The switch circuit 2 is used in this case. The synchronized store circuit 107 writes a value 1 to each of the fields of the vector semaphore register 1 via line 14 and switch circuit 2. In this case, the synchronized store circuit 107 transmits to the switch circuit 2 the number of field of the vector semaphore register 1 onto which be written a value 1 over the line 14. Via the lines 17, the switch circuit 2 writes a value 1 onto the field of the vector semaphore register 1 designated by the synchronized store circuit 107 over the line 14. Via the line 16 and switch circuit 2, furthermore, the synchronized load circuit 108 reads values of fields of the vector semaphore register 1 and writes value 0 thereon. At this moment, the synchronized load circuit 108 transmits to the switch circuit 2 the number of field of the vector semaphore register 1 from which the value is to be read over line 16 or on which the value 0 is to be written as well as the instruction of which the operation is to be executed. Then, the switch circuit 2 reads via the lines 17 the value of a field of the vector semaphore register 1 designated by the synchronized load circuit 108 over the line 16 or writes the value 0 thereon.

Figure 2:
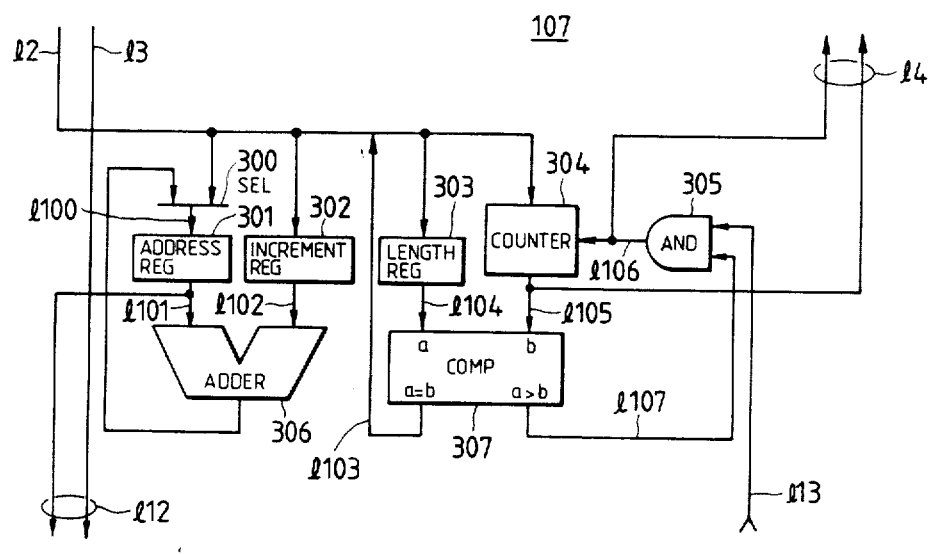
FIG. 2 is a diagram illustrating the configuration of a synchronized store circuit (107) of FIG. 1.

The synchronized store circuit 107 will be described next. The synchronized store circuit 107 controls the writing of vector data from the vector register 103 onto the main storage. Here, the synchronized store circuit 107 is different from the store circuit 105 in regard to that the content of the vector semaphore register 1 is changed. FIG. 2 shows the configuration of the synchronized store circuit 107, wherein reference numeral 300 denotes a selector, 301 denotes a register for storing an address that requests writing to the main storage, 302 denotes a register for holding the increment of address, 303 denotes a register for holding a value obtained by adding 1 to the number of elements of vector data to be stored in the main storage, and reference numeral 304 denotes a counter which holds the number of the element that is to be stored in the next time among all elements of vector data that are to be stored in the main storage, and sets the content thereof to an initial value 1 upon instruction from the line 12. Upon receipt of a signal "1" from the line 1106, the counter 304 increases the content by 1. Reference 305 denotes an AND circuit for finding a logical product, and 306 denotes an adder. Reference numeral 307 denotes a comparator which compares an input value a from a port to which the line 1104 is connected with an input value b from a port to which the line 1105 is connected, and which produces a signal "1" onto the line 1103 only when the input values a and b are equal to each other and produces a signal "0" in other cases. The comparator 307 further produces a signal "1" onto the line 1107 only when the input value a is greater than the input value b, and produces a signal "0" in other cases.

The synchronized store circuit 107 operates as described below. First, the vector instruction control 101 (FIG. 1) writes onto the register 301 a main storage address for storing a first element of vector data to be stored, via line 12, selector 300 and line 1100. The vector instruction control 101 further writes onto the register 302 via line 12 the difference of main storage addresses for storing two neighboring elements of vector data to be stored and writes onto the register 303 a value obtained by adding 1 to the number of elements of vector data to be stored. Then, the vector instruction control 101 sets the content of the counter 304 to 1 via line 12 and drives the synchronized store circuit 107.

When the synchronized store circuit 107 is driven, the comparator 307 compares the value of the register 303 with the content of the counter 304. Further, a signal "0" is produced onto the line 1107 and the AND circuit 305 produces a signal "0". Therefore, the content of the counter 304 remains unchanged. When the value of the register 303 is greater than the content of the counter 304, the synchronized store circuit 107 sends to the main storage 3 (FIG. 1) the content of the register 301 as a main storage address for storing the elements of vector data to be stored, via lines 1101 and 112, and sends to the main storage 3 the element of vector data to be stored sent via read switch 102 in the vector processor 100 (FIG. 1) and line 13 (FIG. 1) as said data that is to be stored, and requests the writing of data. Due to this request, the content of the register 301 and the content of the register 302 are added up together through an adder 306, and the added result is written onto the register 301 via selector 300 and line 1100. In this case, furthermore, since "1" has been output to the line 1107, the AND circuit 305 sends "1" onto the line 1106 upon receipt of a signal from the line 113 indicating that the writing onto the main storage 3 is finished. Content of the counter 304 and signal "1" of the line 1106 are transmitted via line 14 to the switch circuit 2 as a field number and a write request signal of the vector semaphore register 1 (FIG. 1) on which the value 1 is to be written, and the switch circuit writes "1" onto the field of a number designated by the counter 304 among those of the semaphore register 1. The output of the AND circuit 305 is transmitted from the line 1106 to the counter 304, and the content of the counter 304 increases by 1.

Then, as each of the elements of vector data is written onto the main storage 3, a signal "1" is written onto the semaphore register 1 to indicate the completion of writing of each of the elements. When the input values a and b are equal to each other as a result of comparison by the comparator 307, completion of operation is informed to the vector instruction control 101 via lines 1103 and 12.

In the foregoing was described the operation in which the synchronized store circuit 107 wrote vector data to be stored onto the main storage.

Figure 3:
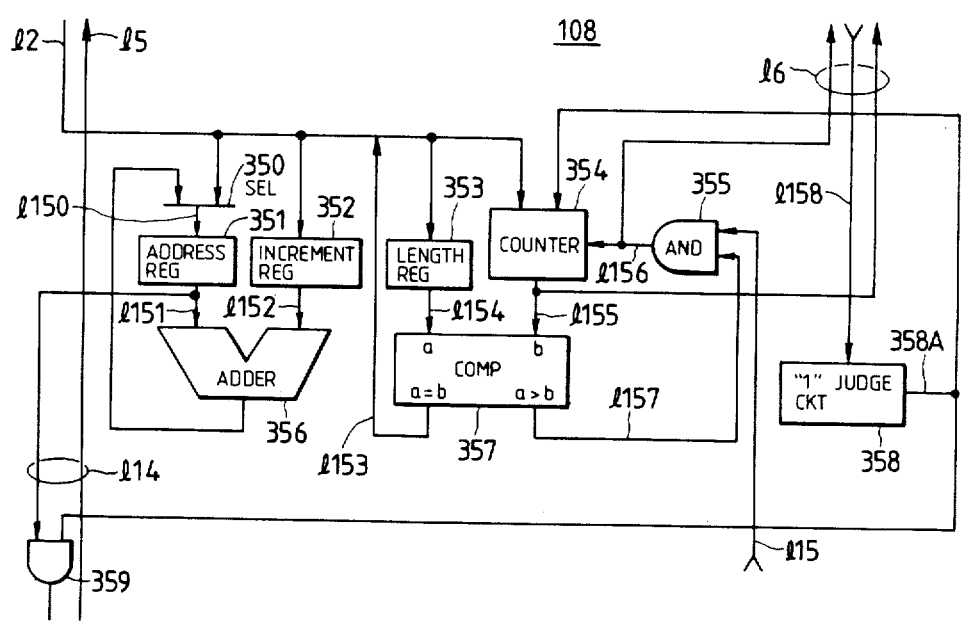
FIG. 3 is a diagram illustrating the configuration of a synchronized load circuit (108) of FIG. 1.

Next, the synchronized load circuit 108 will be described. The synchronized load circuit 108 controls the writing of vector data from the main storage onto the vector register 103. The synchronized load circuit 108 is distinctly different from the store circuit 107 with respect to using the content of the vector semaphore register 1 for controlling the writing of vector data. FIG. 3 illustrates the configuration of the synchronized load circuit 108 which is nearly the same as the configuration of the synchronized store circuit 107 shown in FIG. 2, except the following two points. First, the direction of line 15 of FIG. 3 that corresponds to the line 13 of FIG. 2 is opposite to that of FIG. 2. This is a data line over which the synchronized load circuit 108 transfers the data from the main storage to the vector register 103. Another point is that a "1" judge circuit 358 is newly provided.

The synchronized load circuit 108 operates as described below. First, the vector instruction control 101 (FIG. 1) initializes the registers 351, 352, 353 and counter 354. The manner of initialization is the same as that of the case of the synchronized store circuit 107. After initialization, the vector instruction control 101 drives the synchronized load circuit 108.

When the synchronized load circuit 108 is driven, the comparator 357 compares the value of the register 353 with the content of the counter 354. When the value of the register 353 is greater than the content of the counter 354, the synchronized load circuit 108 sends to the vector semaphore register 1 the content of the counter 354 via switch circuit 2 as a field number of the vector semaphore register 1 from where the value is to be read via line 16. The switch circuit 2 reads the signal in the field of this number in the semaphore register 1 and sends it to the "1" judge circuit 358 via line 1158. When it is learned that the transmitted value is 0 (i.e., vector element of the above number has been written onto the main storage 3) as a result of judgement by the "1" judge circuit 358, the operation is repeated to read the above signal of the vector semaphore register 1. When the vector element to be read from the main storage 3 has not yet been written onto the main storage 3 from the synchronized store circuit 107, the synchronized load circuit 108 does not read the element from the main storage until the writing is finished. When it is learned that the transmitted value is 1, i.e., when it is learned that the writing of the vector element onto the main storage 3 is finished as a result of judgement by the "1" judge circuit 358, the synchronized load circuit 108 opens the AND gate 359 utilizing the output 358A of the judge circuit 358, and sends a request of read to the main storage 3 using the address in the register 351 as a main storage address for storing elements of vector data to be loaded via lines 1151 and 114. After this request, the content of the register 351 and the content of the register 352 are added up together through an adder 356, and the added result is written onto the register 351 via selector 350 and line 1150. In this case, furthermore, the output "1" has been sent onto the line 1157. Therefore, the AND circuit 355 produces a true value onto the line 1156 upon receipt, via line 115, of a signal that indicates that the main storage 3 has produced the required data onto the line 15. Then, the content of the counter 354 and the signal of the line 1156 are transmitted, via line 16 and switch circuit 2, to the vector semaphore register 1 as a field number and a write request signal of vector semaphore register 1 on which the value 0 is to be written. The switch circuit 2 is reset to 0 on the field of the above number of the semaphore register 1. The output of the AND circuit 355 is transmitted to the counter 354 over a line 1156, and the content of the counter 354 increases by 1.

Thus, the corresponding fields in the semaphore register 1 are reset in synchronism with the successive loading of vector elements by the synchronized load circuit 108. As a result of these operations, the comparator 357 compares the two input values a and b. When the two input values are equal to each other, the comparator 357 informs to the vector instruction control 101 of the completion of operation via lines 1153 and 12. Further, since a value whose truth value is false has been produced onto the line 1157, the AND circuit 355 produces a false value. Therefore, the value of the counter 354 remains unchanged.

In the foregoing was mentioned the operation in which the synchronized load circuit 108 reads the vector data to be loaded from the main storage 3.

Next, the storage control 203-j in the element processor 201-j (j=1,—, n) will be described in conjunction with FIG. 4. The storage control 203-j controls access to the main storage 3 when the microcomputer 202-j executes the synchronized load instructions and the synchronized store instruction (both of which have been described already). In FIG. 4, the lines 18-j are connected to the j-th element in the vector semaphore register 1. The line 18-j consist of line 1207, line 1208 and line 1206. The line 1207 is an input signal line for reading a value of j-th element of the vector semaphore register 1, the line 1208 produces a set signal for setting the value of j-th element of the vector semaphore register 1 to "1", and the line 1206 produces a reset signal for resetting the value of j-th element of the vector semaphore register 1 to "0". When the microcomputer 202-j reads the data from the main storage 3, the main storage 3 produces onto the line 1204 a signal that represents this fact at a moment when the data is read by the main storage 3. When the microcomputer 202-j writes the data onto the main storage 3, the main storage 3 inputs to the line 1204 a signal that represents this fact at a moment when the data produced by the microcomputer 202-j is just written onto the main storage 3. Reference numerals 204 and 205 denote inverters that invert input signals, reference numerals 206, 207 and 208 denote AND circuits, and 209 denote and OR circuit.

Described below is the operation of the storage control 203-j at the time when the microcomputer 202-j executes the synchronized load instruction. As the synchronized load instruction is executed, the microcomputer 202-j sends onto the line 1203 an address of main storage 3 of data that is to be loaded, and instructs the main storage 3 to read the data. The microcomputer 202-j further sends a signal "1" onto the line 1201 and waits for until the value on the line 1205 becomes "1". The output of the AND circuit 207 becomes "1" and the value on the line 1205 becomes "1" only when the j-th field of the vector semaphore register 1 input from the line 1207 is "1" and the value from the line 1202 is "1". As the signal on the line 1205 becomes "1", the microcomputer 202-j receives the data that are read out on the line 1204. That is, even when the signal "1" that indicates the completion of reading of data is input onto the line 1202, the data read from the main storage 3 onto the line 204 is not received by the microcomputer 202-j owing to the synchronized load instruction unless the j-th field of the vector semaphore register 1 assumes the value "1". Further, as the output of the AND circuit 207 becomes "1", the signal is sent to the vector semaphore register 1 via line 1206 to reset the value of the j-th field to 0. The same also holds true for executing the synchronized load instruction in other element processors.

Described below is the operation of the storage control 203-j when the microcomputer 202-j executes the synchronized store instruction. The microcomputer 202-j which executes the synchronized store instruction, sends onto the line 1204 the data that is to be stored, sends onto the line 1203 the address of the main storage 3 that is to be stored, and requests the writing to the main storage 3. The microcomputer 202-j then produces an output "1" onto the line 1200 and waits until the signal on the line 1205 becomes "1". As the signal input from the line 1202 becomes "1", i.e., as the main memory 3 finishes the writing and as the output of the AND circuit 206 becomes "1", the signal on the line 1205 becomes "1", the microcomputer 202-j executes an instruction next of the synchronized store instruction, and a signal "1" on the line 1208 causes the value of the j-th field of the vector semaphore register 1 to become "1". The same also holds true for executing the synchronized store instruction in other element processors.

In the foregoing were described the units of parallel computer shown in FIG. 1.

Operation of the parallel computer according to the present invention will now be described.

Among the programs for electronic computers, it has been known that those portions that can be processed in parallel consist of portions that can be efficiently executed using a vector processor since the calculation can be regularly performed like a matrix operation, and portions which can be calculated in parallel like Monte-Carlo simulation or like a deduction processing for realizing a so-called artificial intelligence but which cannot be executed with the vector processor because of their complex calculation. The parallel computer according to the present invention is aimed at calculating these two portions at high speeds, the former one being carried out by the vector processor 100 and the latter one being carried out by the parallel processor 200. When the portions to be calculated by the vector processor 100 and the portions to be calculated by the parallel processor 200 are contained in a program, the two processors are operated and the data are handed over via the main storage 3 as required. The present invention is to hand the data over at high speeds via the main storage 3. First, described below is the operation of the case where the vector processor 100 hands the vector data over to the parallel processor 200 via the main storage 3. It is presumed here that an address is imparted to each byte in the main storage 3, the head address of the region in the main storage 3 used for handing over the vector data is address 100 and each element of the vector data has a size of four bytes. The data are handed over in a manner that a first element of a vector register 103 in the vector processor 100 is handed over to the element processor 202-1 in the parallel processor 200 and the second element is handed over to the element processor 202-2, such that all elements in the vector register 103 are handed one by one over to the element processors. Further, the fields in the vector semaphore register 1 are all set to 0. In this case, the vector processor 100 is programmed in advance as follows:

SYVST VR 2, 100, 4 where SYVST instruction is a synchronized store instruction which causes the vector instruction control 101 to set a value 100 which is a second operand to the register 301 in the synchronized store circuit 107 shown in FIG. 2, set a value 4 which is a third operand to the register 302, set an element number n of vector data possessed by the vector register 103 to the register 303, and set a value 1 to the counter 304, and drives the synchronized store circuit 107. The data are read out successively from the vector register and are sent to the synchronized store circuit 107. Therefore, the program stores the element data of the second vector register starting from the first one onto the address 100, address 104, address 108,—of the main storage 3, successively, and further sets the values of first element, second element, third element,—of the vector semaphore register 1 to 1.

The element processor 202-j (j is an integer of from 1 to n) of the parallel processor 200 is programmed in advance as follows:

SYLD T0, 100+4*(J−1)

where SYLD instruction is a synchronized load instruction of which the operation was described already. After the j-th element of vector data is written onto the main storage 3 and the value of the j-th field of the vector semaphore register 1 becomes 1, the element processor 204-j loads the j-th element from the main storage 3 onto the 0-th register in a group of registers (not shown) in the microcomputer 202-j.

Figure 6:
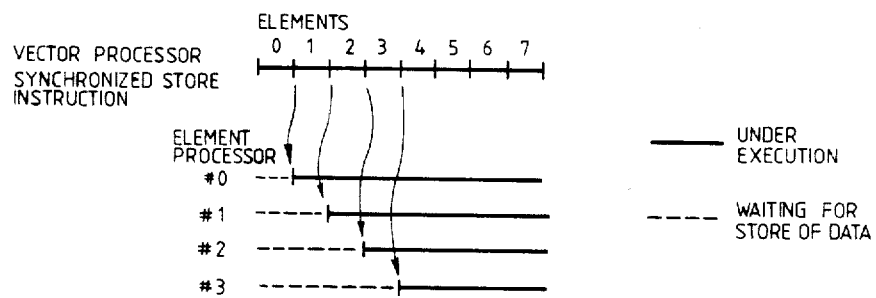
FIG. 6 is a time chart illustrating how to hand over the vector data using the computer of FIG. 1.

With the vector processor 100 and the parallel processor 200 being programmed as described above, the data are transferred from the vector processor 100 to the parallel processor 200 via the main storage 3 as shown in a time chart of FIG. 6.

Described below is the operation of the case where the vector data are handed from the parallel processor 200 over to the vector processor 100 via the main storage 3. When the data is to be handed over, the main storage 3 is used in the same manner as the aforementioned example. Further, the whole fields in the vector semaphore register 1 are all set to 0 in advance. In this case, the element processor 202-j (j=1,—, n) in the parallel processor 200 is programmed in advance as follows:

SYST T0, 100+4*(j−1)

where SYST instruction is a synchronized store instruction of which the operation was described already. The element processor 202-j writes onto the main storage 3 the data in the 0-th register in a group of registers (not shown), and sets the j-th field of the vector semaphore register 1 to 1.

Further, the vector processor 100 is programmed in advance as follows:

SYVLD VR2, 100, 4 where the SYVLD instruction is a synchronized load instruction which causes the vector instruction control 101 to set a value 100 which is a second operand to the register 351 in the synchronized load circuit 108 shown in FIG. 3, set a value 4 which is the third operand to the register 352, set the element number n of the vector data possessed by the vector register to the register 353, and set a value 1 to the counter 354, and drives the synchronized load circuit 108. After the value of the vector semaphore register 1 becomes 1 in the order of first field, second field, third field,—, the synchronized load circuit 108 reads the data in the order of address 100, address 104, address 108,—of main storage 3, sends the data to the second vector register 103, and sets the value to 0 in the order of first field, second field, third field,—of the vector semaphore register 1.

According to the computer of the present invention, the vector data are handed over between the vector processor 100 and the parallel processor 200 via main storage 3, and the two processors are operated simultaneously such that the vector data can be handed over at high speeds.

Second Embodiment

Figure 7:
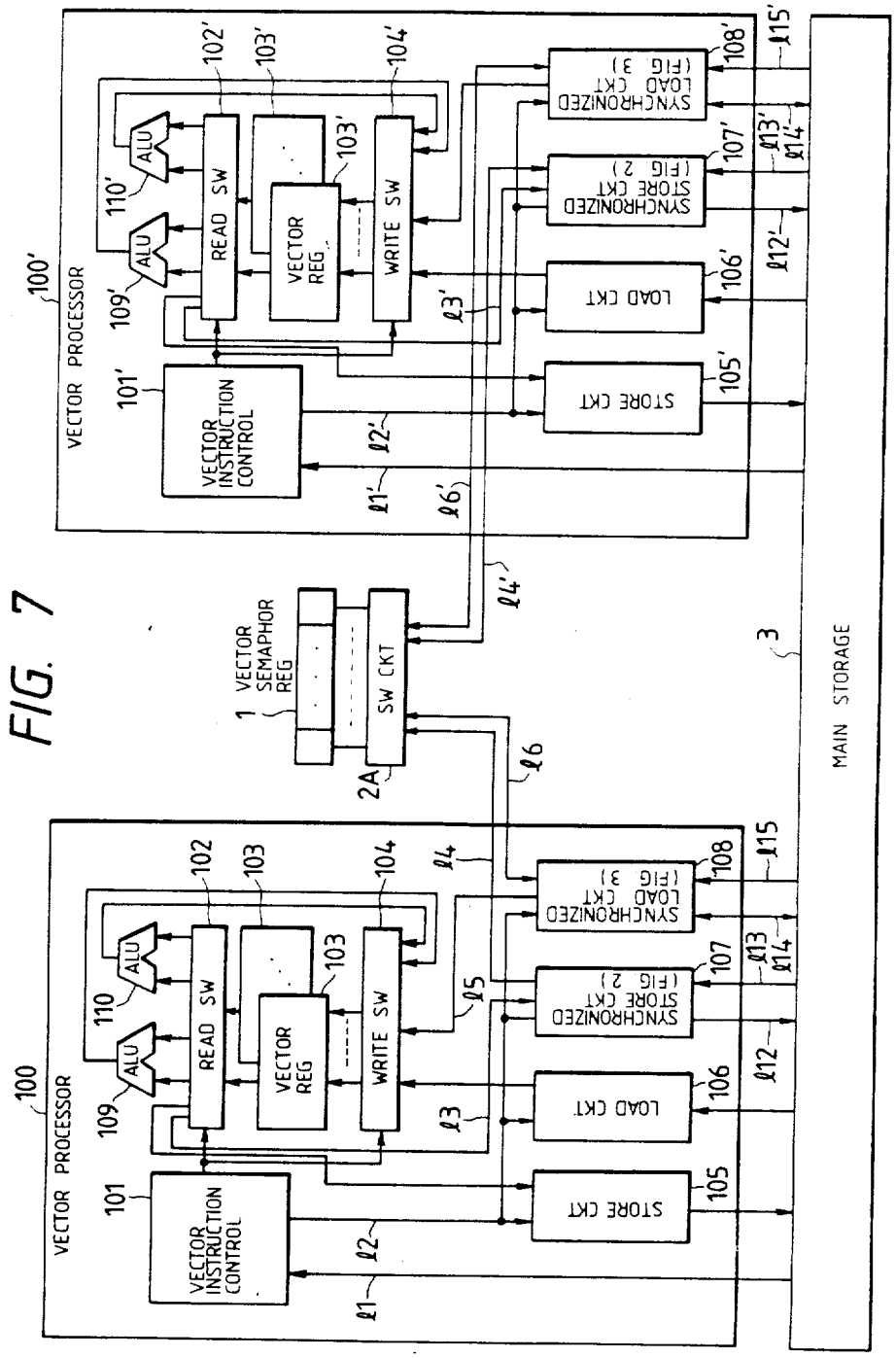
FIG. 7 is a diagram illustrating the whole configuration of the computer according to a second embodiment of the present invention.

A second embodiment will now be described in conjunction with FIG. 7 wherein the same portions as those of FIG. 1 are denoted by the same reference numerals. Further, the reference numerals with prime (') represent the same portions as those denoted by the same reference numerals without prime ('). In FIG. 7, reference numeral 2A denotes a switch circuit which is the same as the switch circuit 2 of the first embodiment. Reference numerals 107 and 107' denote synchronized store circuits, and 108 and 108' denote synchronized load circuits.

Operation of the parallel computer according to the present invention will now be described. The parallel computer according to the present invention is to further increase the speed of calculation by executing a program which can be efficiently executed using a plurality of vector processors. In this case, the vector processors 100 and 100' in the parallel computer proceed the calculation independently of each other, and the program is executed by repetitively handing over the data via the main storage 3. The present invention is to hand the data over via main storage 3 at high speeds in executing the program.

Described below is the operation of the case where the vector processor 100 hands the vector data over to the vector processor 100' via main storage 3. It is presumed here that an address is imparted to each byte in the main storage 3, the head vector of the region in the main storage 3 used for handing over the vector data is address 100 and each element of the vector data has a size of four bytes. The data are handed over in a manner that a first element of a first vector register 103 in the vector processor 100 is handed over to the first element of a second vector register 102 in the vector processor 100' and the second element is handed over to the second element, such that all elements in the first vector register 103 are handed over. Further, the fields in the vector semaphore register 1 are all set to 0. In this case, the vector processor 100 is programmed in advance as follows:

SYVST VR2, 100, 4 where SYVST instruction is a synchronized store instruction which is the same as the one described in the first embodiment. Being programmed as described above, the vector processor 100 stores the element data of the second vector register 103 starting from the first one onto the address 100, address 104, address 108,—of the main storage 3 successively, and further sets the values of first field, second field, third field,—of the vector semaphore register 1 to 1.

The vector processor 100' is programmed in advance as follows:

SYVLD VR2, 100, 4 where SYVLD instruction is a synchronized load instruction which is the same as the one mentioned in the first embodiment. Being programmed as described above, the vector processor 100' waits for until the values become 1 in the order of first field, second field, third field,—of the vector semaphore register 1, reads the data in the order of address 100, address 104, address 108, —of the main storage 3, sends the data to the second vector register 103, and sets the values to 0 in the order of first field, second field, third field,—of the vector semaphore register 1.

The same also holds true even when the vector processor 100' hands the vector data over to the vector processor 100 via main storage.

Figure 8:
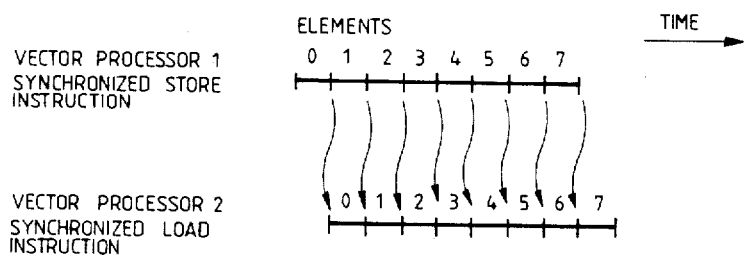
FIG. 8 is a time chart illustrating how to hand over the vector data using the computer of FIG. 7.

According to the parallel computer of the present invention, the vector data are handed over between the vector processor 100 and the vector processor 100' via main storage as described above, and the two processors are operated simultaneously as shown in FIG. 8 such that the vector data can be handed over at high speeds.

Third Embodiment

Figure 9:
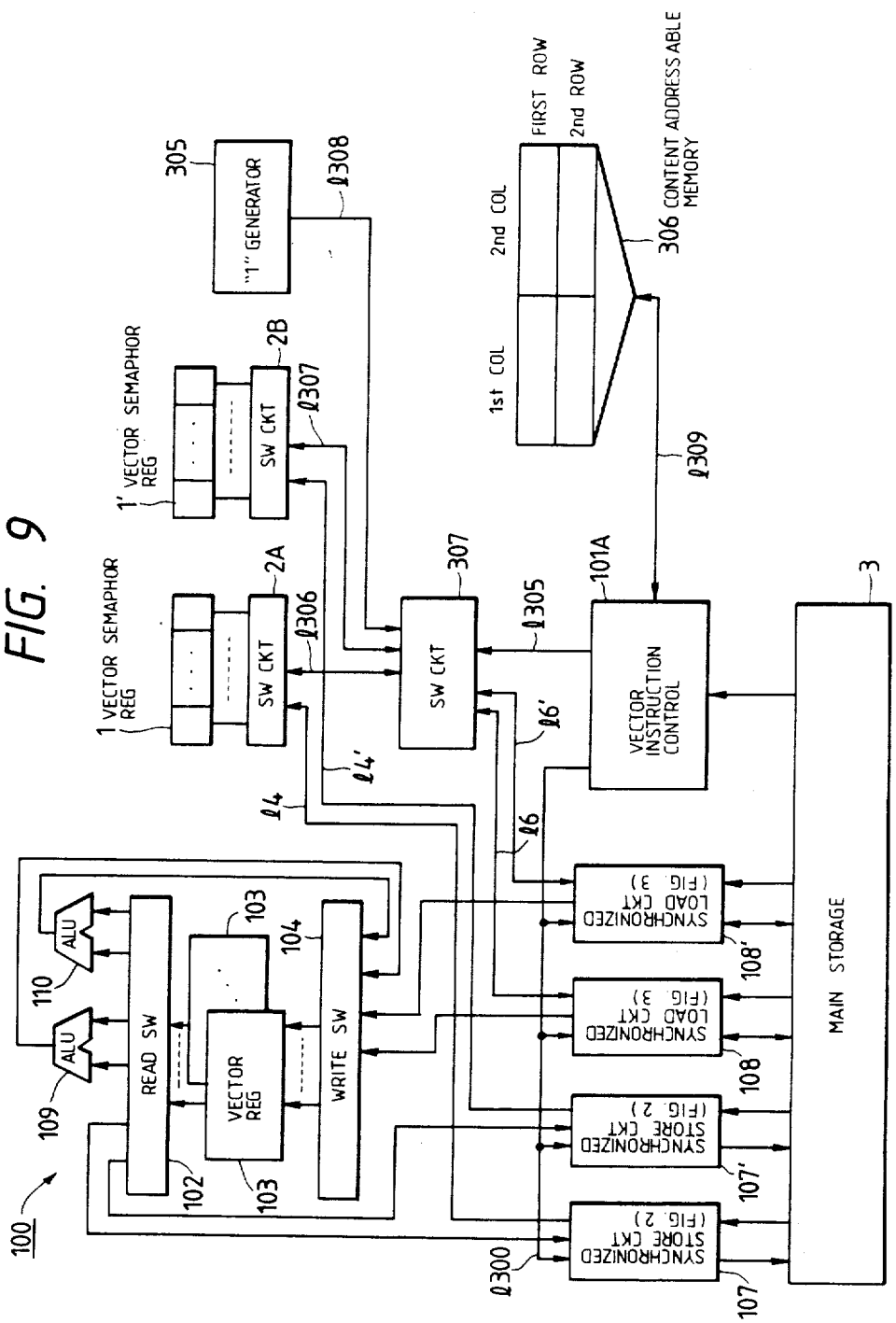
FIG. 9 is a diagram illustrating the whole configuration of the computer according to a third embodiment of the present invention.

A third embodiment will now be described in conjunction with FIG. 9. The third embodiment is concerned with a vector processor. In FIG. 9, the same portions as those of FIG. 1 are denoted by the same reference numerals. Further, the reference numerals with prime (') represent the same portions as those denoted by the same reference numerals without prime (').

In FIG. 9, reference numeral 101A denotes a vector instruction control which is slightly modified from the vector instruction control 101 of FIG. 1, and its details will be described later. Reference numeral 307 denotes a switch circuit which is newly added in this embodiment and which connects the line 16 to any one of line 1306, 1307 or 1308 and which further connects the line 16' to any one of line 1306, 1307 or 1308 based upon a signal sent from the vector instruction control 101A over a line 1305. Reference numeral 306 denotes a content addressable memory which is newly added in this embodiment and which is capable of registering the data, erasing the data or retrieving the data content addressably with a row as a unit being controlled by the vector instruction control 101A over a line 1309. At the time of content addressable retrieval, the content addressable memory receives from the vector instruction control 101A the data that is to be retrieved in the first column and the data that is to be retrieved in the second column. When a row in which both of the input data are in agreement is registered in the content addressable memory 306, the content addressable memory informs the vector instruction control 101A of the row number. When there does not exist such a row, the content addressable memory informs the vector instruction control 101A of the fact that the input data are not in agreement. Reference numeral 305 denotes a "1" generator which is newly added in this embodiment, and which returns the value 1 over a line 1308.

The vector instruction control 101A uses either the synchronized store circuit 107 or 107' when the vector data held by the vector register 103 is to be written onto the main storage 3. Which one should be used is suitably determined by the vector instruction control 101A. The description here is based on the presumption that the synchronized store circuit 107 is selected. In this case, the vector instruction control 101A of this embodiment effects for the synchronized store circuit 107 the operation which is the same as the initialization and start of the synchronized store circuit effected by the vector instruction control 101 of FIG. 1 for executing the synchronized store instruction. The vector instruction control 101A further stores onto the first column of first line of the content addressable memory 306 the main storage address for storing the first element of vector data to be stored via line 1309, and further stores onto the second column of first line a difference in the main storage addresses for storing the two neighboring elements of vector data that is to be stored. When the operation of the synchronized store circuit 107 that is started is finished, the data registered onto the first row of the content addressable memory 306 owing to the abovementioned operation is then erased from the content addressable memory 306.

In the foregoing was mentioned the operation of the case where the vector instruction control 101A has selected the synchronized store circuit 107 to write vector data onto the main storage 3. When the synchronized store circuit 107' is selected, the operation same as the one described above is carried out except the manipulation of the second row of the content addressable memory 306.

When the vector data in the main storage 3 is to be read onto the vector register 103 by the vector instruction control 101A, use is made of either the synchronized load circuit 108 or 108'. Which one should be used is suitably determined by the vector instruction control 101A. The description here is based on the presumption that the synchronized load circuit 108 is selected. In this case, the vector instruction control 101A of this embodiment effects the following operation in addition to the operation for the synchronized load circuit 108 same as the initialization and start of the synchronized load circuit effected by the vector instruction control 101 of FIG. 1 to execute the synchronized load instruction.

A difference between a main storage address storing a first element of vector data to be loaded and a main storage address storing two neighboring elements of vector data to be loaded, is given via line 1309 to the content addressable memory 306 as data of a first row and data of second row in order to effect the content addressable retrieval. As a result of content addressable retrieval, when the content addressable memory 306 returns a value of first row back to the vector instruction control 101A over the line 1309, i.e., when there exists coincident data in the first row of the content addressable memory 306, the vector instruction control 101A instructs via line 1305 the switch circuit 307 to connect the lines (6 and 1306 together. When the content addressable memory 306 returns a value which is the second row over the line 309, the vector instruction control 101A instructs the switch circuit 307 to connect the lines 16 and 1307 together. When the content addressable memory 306 returns a value which is noncoincident, the vector instruction control 308 instructs the switch circuit 307 to connect the lines 16 and 1308 together.

The switch circuits 2A and 2B operate in the same manner as the switch circuit 2 of FIG. 1.

As a result of the content addressable retrieval, when the content addressable memory 306 returns a value which is first row or second row back to the vector instruction control 101A, the following operation is carried out. That is, the vector instruction control 101A monitors the first row of the content addressable memory 306 when the value returned from the content addressable memory 306 is the first row, and monitors the second row of the content addressable memory when the value that is returned is the second row. When the data stored in the row being monitored is erased, the vector instruction control 101A instructs via line 1305 the switch circuit 307 to change the line to the line 1308 to be connected to line 16.

In the foregoing was described the operation of when the synchronized load circuit 108 was selected such that the vector instruction control 101A could read vector data from the main storage 3 onto the vector register 103. When the synchronized load circuit 108' is selected, the operation is carried out in the same manner as described above except that the line 16' is used instead of the line 16.

The vector processor according to the present invention operates as described below. First, the vector instruction control 101A reads vector instruction from the main storage 3, and examines if constitutional elements of the vector processor necessary for executing the operation designated by the instruction are now being in operation. When the constitutional elements are not in operation, the constitutional elements are assigned to the instruction that is read out to start the operation of instruction; i.e., the next vector instruction is read out to repeat the operation same as the above-mentioned operation. That is, operation of the next vector instruction can be started without waiting for the completion of operation of each of the vector instructions, and constitutional elements of the vector processor can be operated in parallel. When the constitutional elements necessary for executing the operation designated by the instruction are now in operation, the vector processor waits until the constitutional elements are no more in operation.

Among the above-mentioned operations of the vector processor, the present invention is to execute the following instruction sequences at high speeds.

VST VR2, 100, 4
(Other instruction sequences)
VLD VR4, 100, 4 where VST instruction is a store instruction for successively storing vector data in the vector register designated by a first operand from the address (hereinafter referred to as base address) in the main storage 3 designated by a second operand starting from the first element maintaining a distance (hereinafter referred to as increment) of address designated by a third operand. The VLD instruction is a load instruction which successively loads the vector data stored maintaining a distance of increment designated by the third operand from the base address designated by the second operand onto the vector register designated by the first operand. That is, the above program works to temporarily store the vector data stored in the second vector register successively onto address 100, address 104, address 108, —of the main storage 3 starting from the first element, and read the vector stored in the address 100, address 104, address 108,—of the main storage 3 onto the fourth vector register after the operation designated by other instruction sequence is carried out.

Figure 10:
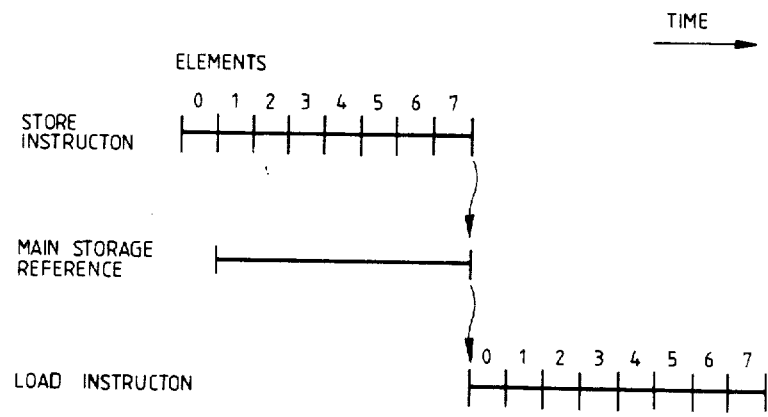
FIG. 10 is a time chart for ensuring the sequence of main storage references according to prior art.

In the conventional vector processor, the following problem arouses. That is, the vector processor initiates the operation of the next instruction without confirming the completion of the operation of the present instruction, and there exists a probability that the operation of the instruction that is started later may end earlier than the operation of the instruction that is started earlier. In executing the above-mentioned program, therefore, the VLD instruction may work to read the elements subsequent to the tenth element of the vector data from the main storage 3 before the tenth element of the vector data is written onto the main storage 3 by the VST instruction. That is, the sequence of main storage references may become out of order. In order to avoid this, the conventional vector processor is provided with an instruction for ensuring the sequence of main storage references in order to "wait for the completion of all main storage references by the preceding instruction". In the case of the above-mentioned program, the sequence of main storage references is ensured by placing the instruction for ensuring the sequence of main storage references between the store instruction and the load instruction. FIG. 10 is a time chart illustrating the operation of the vector processor.

In order to solve the above-mentioned problem, the vector processor according to the present invention is constructed as described below.

First, the store instruction is executed by using the synchronized store circuit 107 (or 107'). In this case, the base address and increment of a region in the main storage 3 storing the vector data are registered into the content addressable memory 306 owing to the aforementioned operation of the vector instruction control 101A, and the value 1 is successively set to the vector samaphore register 1 (or 1') starting from the first field in the same manner as in FIG. 1.

On the other hand, the load instruction is executed using the synchronized load circuit 108 (or 108'). In this case, the content addressable retrieval is effected for the content addressable memory 306 by the base address and increment in a region in the main storage 3 storing the vector data owing to the aforementioned operation of the vector instruction control 101A. When the data are not in agreement, the line 16 (or 16') over which the synchronized load circuit 108 (or 108') makes access to the vector semaphore register 1 (or 1') is connected to the "1" generator 305 through the line 1308. Therefore, the synchronized load circuit 108 (or 108') continuously reads the vector data in the main storage 3. When the results of content addressable retrieval are not noncoincident, it means that the synchronized load circuit 108 (or 108') is writing the data onto the main storage 3, the vector data being the one that is to be read out from the main storage 3. In this case, in order that the synchronized load circuit 108 (or 108') can make access to the vector semaphore register 1 (or 1'), the vector instruction control 101A connects the line 16 (or 16') to the vector semaphore register 1 or 1' connected to the synchronized store circuit 107 or 107' whose vector data have now been written onto the main storage 3. Like in the case of FIG. 7, therefore, the synchronized load circuit 108 (or 108') reads the main storage 3 while effecting the queueing so that the reading is effected after the writing for every element in the vector data. Furthermore, when the operation of the synchronized store circuit 107 or 107' is finished while the synchronized load circuit 108 (or 108') is reading the main storage 3 by making reference to the vector semaphore register 1 (or 1'), the vector instruction control 101A instructs the switch circuit 307 to connect the line 16 (or 16') to the "1" generator 305. Therefore, the vector data in the main storage 3 are continuously read out by the synchronized load circuit 108 (or 108').

Figure 11:
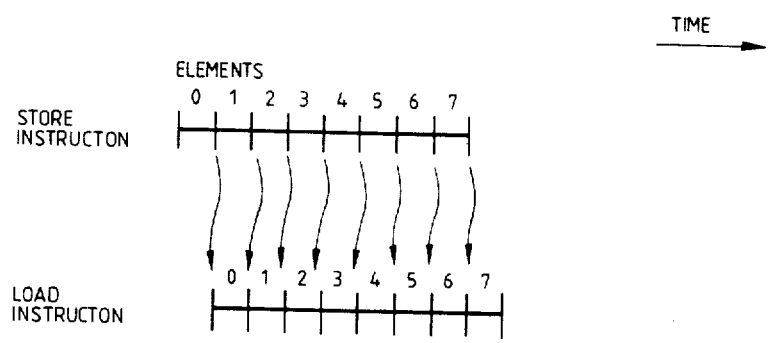
FIG. 11 is a time chart for ensuring the sequence of main storage references using the computer of FIG. 9.

FIG. 11 is a time chart illustrating the operation of when the vector processor according to the present invention executes the above-mentioned program. It will be recognized that the operation is performed at a speed faster than that of FIG. 10.

According to a parallel computer which shares the main storage for processing the vector data of the present invention, the vector data are handed over among a plurality of processors via the main storage. Namely, the operation of the processor for writing vector data onto the main storage on the side for sending the vector data is carried out in parallel with the operation of the processor for reading the vector data on the side for receiving the vector data yet ensuring the sequence of main storage references. Therefore, the parallel computer can be efficiently utilized.

What is claimed is:

1. A computer comprising:
   (a) a main storage;
   (b) a writing means responsive to at least one first program instruction for writing a group of ordered data elements designated by the first program instruction into arbitrary locations within said main storage;
   (c) a reading means responsive to at least one second program instruction for reading said group of data elements from said main storage; and,
   (d) an access controlling means connected to said writing means and said reading means and responsive to the at least one first instruction and the at least one second instruction for controlling access by said reading means to inhibit said reading means from trying to read each data element among said group of data elements before the each data element has been written by said writing means, said controlling means including:
   a register for holding status signals each of which indicates whether a corresponding one of said group of data elements has been written into said main storage, irrespective of the locations within said main memory in which the group of data elements are written;
   a first means connected to said register and responsive to the at least one register and responsive to the at least one first instruction for writing status signals that respectively represent completion of writing each corresponding data element of the group of data elements into a corresponding position of said register, in synchronism with completion of writing of the corresponding data element onto said main storage by said writing means and irrespective of location within said main memory in which the group of data elements is written; and
   a second means connected to said register and to said reading means and responsive to the at least one second instruction for inhibiting the reading means for reading each element of the group of data elements until the status signal is stored in said register for the corresponding data element.

2. A computer according to claim 1, wherein said first means has means for writing the status signal that indicates the completion of writing for each of the data elements onto said register, in response to each of the write finish signals which is supplied from said main storage when the data element has been written onto said main storage.

3. A computer according to claim 1, wherein said first means has means for generating an element number of a data element written by said writing means, in synchronism with writing thereof by said writing means, and for sending to said register said element number to indicate a position in said register in which the status signal that indicates completion of writing is to be written.

4. A computer according to claim 1, wherein said computer has first and second processors connected to said main storage, and said writing means and said reading means are contained in said first and second processors, respectively.

5. A computer according to claim 1, wherein said computer has at least one processor connected to said main storage, and said writing means and said reading means are contained in said processor.

6. A computer comprising:
   (a) a main storage;
   (b) a vector processor connected to said main storage, the vector processor including:
   a writing means responsive to a vector store instruction executed by the vector processor for sequentially writing vector elements of first vector data into locations within said main storage designated by the vector store instruction, and
   a reading means responsive to a vector load instruction for reading vector elements of second vector data from locations within said main storage designated by the vector load instruction;
   (c) a plurality of element processors connected to said main storage, each element processor including:
   access means responsive to a data load instruction executed by the element processor for reading a corresponding vector element of said first vector data from a location within said main storage designated by the data load instruction and responsive to a data store instruction executed by the element processor for writing a corresponding vector element of said second vector data onto a location within said main storage designated by the data store instruction; and (d) a controlling means connected to said vector processor and to said plurality of element processors for controlling transfer of the first and second vector data via said main storage between said vector processor and said plurality of element processors such that the element processors are inhibited from reading respective vector elements of said first vector data from said main storage before said vector processor writes the vector elements into said main storage, and such that the vector processor is inhibited from reading respective vector elements of said second vector elements from said main storage before said plurality of element processors write the vector element into said main storage, said controlling means including:

a register for holding status signals each of which indicates whether a corresponding vector element of vector data to be transferred via said main storage between said vector processor and said plurality of element processors has been written into said main storage, irrespective of locations within said main memory into which said vector data to be transferred is written;

a first means connected to said register and responsive to the vector store instruction for writing status signals that respectively represent completion of writing corresponding vector elements of the first vector data into positions corresponding to the written vector elements within said register, in synchronism with the completion of writing of the corresponding vector elements into said main storage by said writing means and irrespective of locations within said main memory into which the vector elements of the first vector data are written and responsive to the data write instruction executed by one of the element processor writing a status signal indicative of completion of writing for a corresponding vector element of the second vector data into a position corresponding to the written vector element within said register and in synchronism with completion of writing of the vector element of the second vector data onto said main storage by said access means within said one element processor; and a second means connected to said register, said reading means of said vector processor and said access means of each element processor and responsive to said vector load instruction for inhibiting each of said vector elements of the second vector data from being read by said reading means of said vector processor until the status signal indicative of completion of writing for the vector element is stored in said register for the corresponding vector element and responsive to said data load instruction executed by one of said plurality of element processors for inhibiting a corresponding vector element designated by the vector store instruction of the first data from being read by said access means within the corresponding one of the element processors until the status signal indicative of completion of writing is stored in said register for the corresponding vector element.

7. A computer according to claim 6, wherein said first means has means for writing the status signal that indicates completion of writing each of the vector elements onto said register, in response to write finish signals which are supplied from said main storage when the vector elements have been written into said main storage.

8. A computer according to claim 6, wherein said first means has means for generating an element number of a vector element written by said writing means, in synchronism with writing thereof by said writing means, and for sending to said register said element number to indicate a position in said register in which the status signal that indicates completion of writing is to be written.

9. A computer comprising:

(a) a main storage;

(b) at least one vector processor connected to said main storage, each vector processor including:
at least one writing means responsive to vector store instruction executed by the vector processor for sequentially writing a group of vector elements into said main storage, and
at least one reading means responsive to a vector load instruction for sequentially reading the group of vector elements from said main storage; and (c) a controlling means connected to said writing means and said reading means for controlling transfer of the vector data via said main storage between said writing means and said reading means such that said reading means in inhibited from reading vector elements that have not yet been written by said writing means, said controlling means including:
a register for holding status signals each of which indicates whether a corresponding vector element has been written into said main storage, irrespective of locations within said main storage where the vector elements are written;
first means connected to said register and responsive to the vector store instruction for writing status signals that respectively represent completion of writing onto positions in said register corresponding to the respective vector elements, each in synchronism with completion of writing of each of the vector elements onto said main storage by said writing means and irrespective of locations within said main storage where the vector elements are written; and
second means connected to said register, and to said reading means and responsive to the vector load instruction for inhibiting each of said vector elements from being read by said reading means until the status signal that represents completion of writing for the corresponding vector element is stored in said register.

10. A computer according to claim 9, wherein said first means has means for writing the status signal that indicates completion of writing for each of the vector elements onto said register, in response to each of a plurality of write finish signals which are supplied from said main storage when each vector element has been written into said main storage.

11. A computer according to claim 9, wherein said first means has means for generating an element number of a vector element written by said writing means, in synchronism with writing thereof by said writing means, and for sending to said register said element number to indicate a position in said register of the status signal that indicates completion of writing is to be written.

12. A computer comprising:
 (a) a main storage;
 (b) first and second vector processors connected to said main storage, each vector processor having:
  a writing means responsive to a vector store instruction executed by one of said first and second vector processors for sequentially writing a group of vector data elements onto said main storage, and
  a reading means responsive to a vector load instruction executed by another of said first and second vector processors for sequentially reading the group of vector data elements from said main storage; and
 (c) a controlling means connected to said writing means and said reading means provided in each of said first and second vector processors for controlling transfer of the vector data elements via said main memory between said first and second vector processors such that each vector processor is inhibited from reading vector data elements before each is written by the other vector processor, said controlling means including:
  a register for holding status signals each of which indicates whether a corresponding one of said group of vector elements have been written into said main storage, irrespective of locations within said main storage where the group of vector data elements are written;
  first means connected to said register and responsive to the vector store instruction for writing status signals that respectively represent completion of writing of a corresponding one of the group of vector elements onto corresponding positions of said register, in synchronism with completion of writing of the corresponding vector elements onto said main storage by said writing means and irrespective of locations within said main storage where the group of vector elements are written; and
  second means connected to said register and to said reading means and responsive to the vector load instruction for inhibiting each of said vector elements from being read by said reading means until the corresponding status signal is stored in said register for the vector element.

13. A computer according to claim 12, wherein said first means includes means for writing the status signal that indicates completion of writing for each of the vector elements onto said register, in response to write finish signals which are supplied from said main storage when the vector elements are respectively written into said main storage.

14. A computer according to claim 12, wherein said first means has means for generating an element number of a vector element written by said writing means, in synchronism with writing thereof by said writing means, and for sending to said register said element number to indicate a position in said register in which to write the status signal that indicates completion of writing.

* * * * *

UNITED STATES PATENT AND TRADEMARK OFFICE
CERTIFICATE OF CORRECTION

PATENT NO. : 4,985,827
DATED : January 15, 1991
INVENTOR(S) : Naoki Hamanaka, et al.

It is certified that error appears in the above-identified patent and that said Letters Patent is hereby corrected as shown below:

Claim 1, column 16, lines 8-9, delete "register and responsive to the at least one".

Claim 6, column 17, line 63, after "first" insert --vector--.

Claim 9, column 18, line 20, after "to" insert --a--.

Claim 9, column 18, line 32, delete "in" and insert therefor --is--.

Signed and Sealed this

Twelfth Day of May, 1992

*Attest:*

DOUGLAS B. COMER

*Attesting Officer*     *Acting Commissioner of Patents and Trademarks*